(12) United States Patent
Carroll

(10) Patent No.: US 6,895,990 B1
(45) Date of Patent: May 24, 2005

(54) WATER HEATER FAIL SAFE APPARATUS

(76) Inventor: James H. Carroll, P.O. Box 626, Kodak, TN (US) 37764

(*) Notice: Subject to any disclaimer, the term of this patent is extended or adjusted under 35 U.S.C. 154(b) by 0 days.

(21) Appl. No.: 10/925,080

(22) Filed: Aug. 25, 2004

(51) Int. Cl.[7] ................. F16K 31/20; F16K 31/524; F16K 33/00
(52) U.S. Cl. ............... 137/312; 122/504; 122/507; 137/421; 137/428; 137/429; 137/446; 141/86; 220/571; 222/108; 251/74
(58) Field of Search ................. 137/312, 416, 137/420, 421, 428, 429, 430, 433, 446; 122/504, 122/507; 141/86; 220/571; 222/108; 251/73, 251/74; 340/604, 605

(56) References Cited

U.S. PATENT DOCUMENTS

| 201,979 | A | * | 4/1878 | Anderson | 137/421 |
|---|---|---|---|---|---|
| 1,028,681 | A | * | 6/1912 | Creighton et al. | 251/74 |
| 2,739,939 | A | * | 3/1956 | Leslie | 137/428 |
| 2,767,732 | A | * | 10/1956 | Hodgson et al. | 137/428 |
| 2,809,752 | A | * | 10/1957 | Leslie | 137/428 |
| 2,886,056 | A | * | 5/1959 | Ratliff | 137/428 |
| 3,532,112 | A | * | 10/1970 | Adams | 137/428 |
| 3,553,740 | A | * | 1/1971 | Fogg | 137/428 |
| 3,908,206 | A | * | 9/1975 | Grewing | 137/428 |
| 3,920,031 | A | * | 11/1975 | Maxfield | 137/312 |
| 4,471,798 | A | * | 9/1984 | Johannesen | 137/428 |
| 4,735,230 | A | * | 4/1988 | Detloff | 137/428 |
| 4,909,274 | A | * | 3/1990 | Rodriguez | 137/312 |
| 5,632,302 | A | * | 5/1997 | Lenoir, Jr. | 137/312 |
| 5,682,919 | A | * | 11/1997 | DiMaggio | 137/421 |
| 5,790,991 | A | * | 8/1998 | Johnson | 137/428 |
| 5,839,466 | A | * | 11/1998 | Dutter | 137/428 |
| 6,024,116 | A | * | 2/2000 | Almberg et al. | 137/312 |
| 6,206,337 | B1 | * | 3/2001 | Veillet, Jr. | 251/74 |
| 6,253,785 | B1 | * | 7/2001 | Shumake et al. | 122/504 |
| 6,336,469 | B1 | * | 1/2002 | Nixon et al. | 122/507 |
| 6,543,471 | B1 |   | 4/2003 | Carroll |   |

* cited by examiner

Primary Examiner—George L. Walton
(74) Attorney, Agent, or Firm—Norman B. Rainer

(57) ABSTRACT

Apparatus for automatically shutting off the water supply to a leaking water heater includes a water collecting tray positionable beneath the heater, a valve mechanism attachable to the tray, a float mechanism, and an action arm interactive between the float mechanism and valve mechanism. When water collects in the tray, the float mechanism rises, causing the action arm to trigger the release of a spring-urged component of the valve mechanism to discontinue flow of water to the heater.

9 Claims, 3 Drawing Sheets

WATER HEATER FAIL SAFE APPARATUS

BACKGROUND OF THE INVENTION

1. Field of the Invention

This invention relates to apparatus for preventing flooding as a result of leakage from a water heater located in a building, and more particularly concerns apparatus for detecting such leakage and shutting off water flow to the leaking water heater.

2. Description of the Prior Art

Water heaters, whether in residential or commercial buildings, are susceptible to failure in a manner wherein the water within the heater and water entering the heater will leak uncontrollably onto the underlying floor. Such flooding could cause extensive damage to the building and its contents.

Systems have earlier been described for sensing a leak in a plumbing system, and automatically turning off the water feeding the plumbing system. One type of such detection and control system employs flow monitoring sensors intended to discriminate between normal water flow and abnormal flows attributable to leaks. Such systems monitor either instantaneous flow or flows over a timed period, and send an electrical control signal to a shut-off valve. Such systems are disclosed, for example, in U.S. Pat. Nos. 4,589,435; 4,705,060; 5,000,224; 5,038,802; 5,056,554; 5,086,806 and elsewhere. Water shut-off systems of the aforesaid nature usually involve expensive computerized equipment and generally require specialized programming for proper installation.

In still other flood control systems, as disclosed in U.S. Pat. No. 4,324,268 and 5,240,022, sensors are disposed at floor level for detecting the presence of water, said sensors employing the water to complete an electrical circuit between two closely spaced electrodes. Such systems are unfortunately activated by the small amounts of water employed in the wet-mopping of floors, or small amounts of accidentally spilled water.

In yet another type of plumbing flood control system, as disclosed in U.S. Pat. No. 6,523,562, a float-activated electrical switch positioned in a water-accumulating chamber is employed to control an electrically actuated valve. All the aforesaid plumbing flood control systems require a dependable source of electricity, and further permit the possibility of denial of water service to essential but sporadically operating systems such as fire extinguishing systems, lawn watering and cooling systems.

U.S. Pat. No. 6,543,471 describes a spring operated mechanism which, in response to the rising of a float device within a collecting pan beneath a water heater, causes a trigger mechanism to close a valve that supplies water to said heater. However, said spring mechanism requires a tether line that extends to an operating lever of the valve, and such arrangement compromises the reliability of the mechanism. Also, the trigger mechanism is subject to malfunction due to effects of corrosion or dirt accumulation.

It is accordingly an object of the present invention to provide apparatus of improved reliability for automatically preventing flooding that might be produced by a faulty water heater.

It is a further object of this invention to provide apparatus as in the foregoing object which does not require a source of electricity.

It is another object of the present invention to provide apparatus of the aforesaid nature which is easily installable and is of durable construction amenable to low cost manufacture.

These objects and other objects and advantages of the invention will be apparent from the following description.

SUMMARY OF THE INVENTION

The above and other beneficial objects and advantages are accomplished in accordance with the present invention by an apparatus for automatically shutting off a water supply to a leaking water heater, said apparatus comprising:

a) a water-collecting tray having a perimeter sidewall bounded by interior and exterior surfaces, and configured to be positioned beneath said water heater,
b) a float adapted to rest upon water that may accumulate within said tray,
c) guide means that permits vertical movement of said float while preventing substantial lateral movement thereof,
d) a valve housing attachable to the interior surface of said sidewall and comprised of wall structure vertically elongated between upper and lower extremities and having:
  1) a drive rod slideably centered within said valve housing by way of a water tight seal,
  2) a first valve member attached to the bottom extremity of said drive rod,
  3) a stationary second valve member incorporated into said wall structure,
  4) upper and lower portals located respectively above and below said second valve member, one of said portals permitting entrance of water into said housing, and the other portal permitting egress and routing of said water to said water heater, and
  5) a coil spring interactive between said lower extremity and said first valve member, and serving to force said first valve member upwardly, and
e) an action arm comprised of a cam portion and an elongated lever portion interactive with said float, said action arm being pivotably joined to said housing adjacent said upper extremity in a manner to permit movement of said action arm in a vertical plane while positioning said cam portion to exert downward force upon the top extremity of said drive rod, whereby,
f) when water accumulates within said tray as a result of leakage from said water heater, said float rises, causing said lever portion to rise, thereby causing said cam portion to release downward force from said drive rod, allowing said spring to drive said first valve member into sealing relationship with said second valve member, thereby discontinuing flow of water to the water heater.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
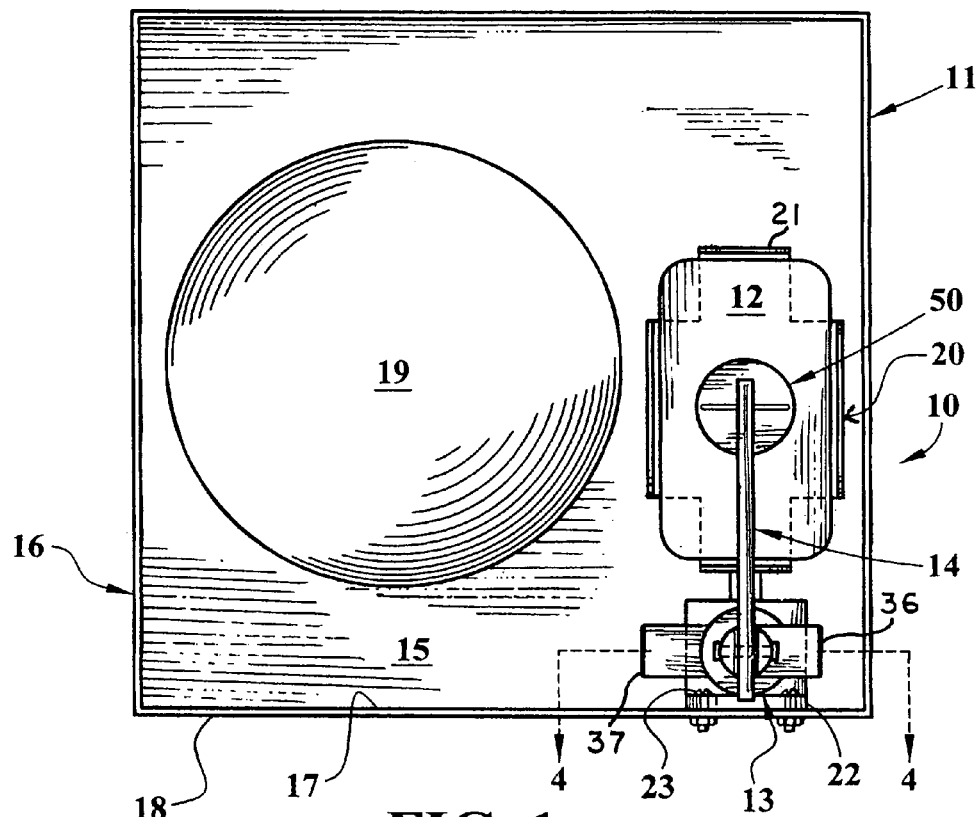
FIG. 1 is a top view of an embodiment of the apparatus of the present invention, shown in its stand-by state.
Figure 2:
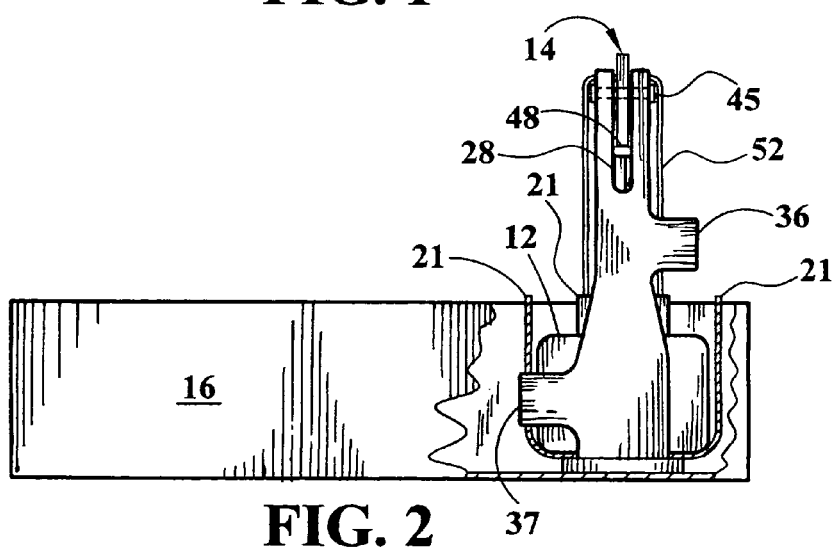
FIG. 2 is a front view thereof with portions broken away to show otherwise hidden details.
Figure 3:
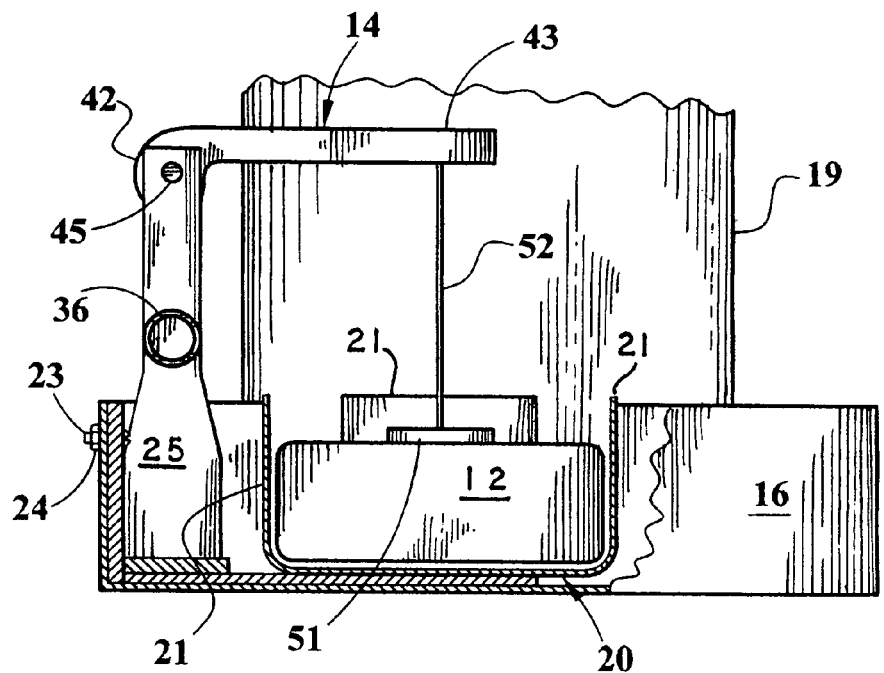
FIG. 3 is a side view thereof with portions broken away.
Figure 4:
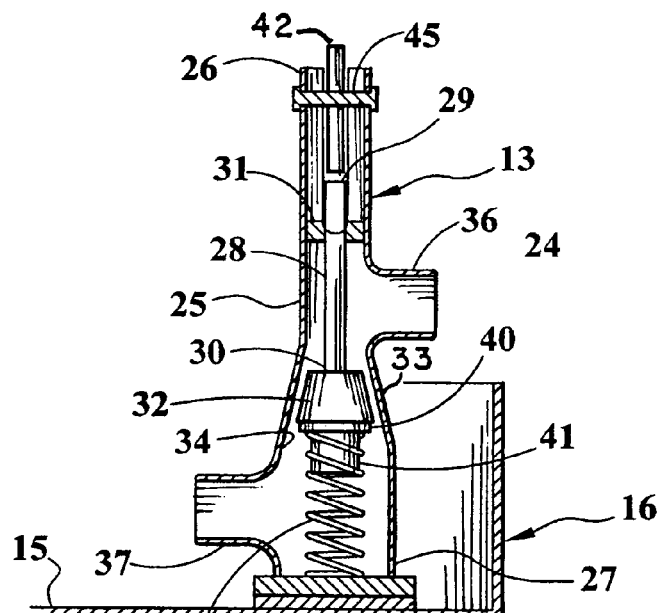
FIG. 4 is a sectional view taken in the direction of the arrows upon the line 4—4 of FIG. 1.
Figure 5:
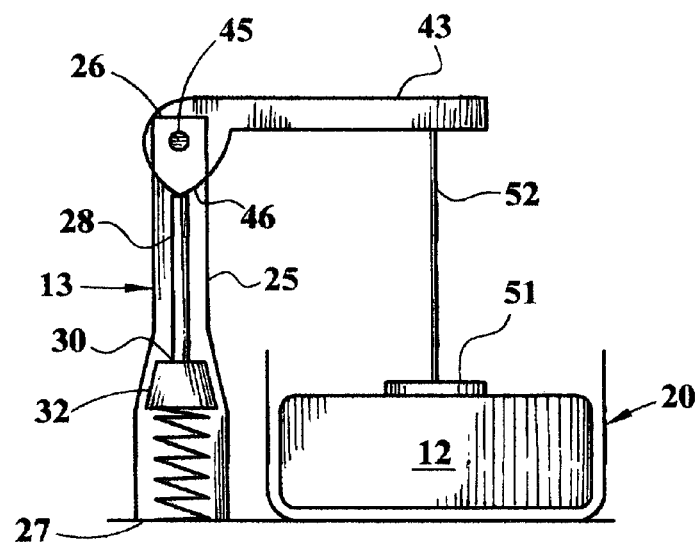
FIG. 5 is a schematic side view showing the position of components during the stand-by state of the apparatus which allows water flow therethrough.

Referring now to FIGS. 1–6, an embodiment of the water heater fail-safe apparatus 10 of this invention is shown comprised of water-collecting tray 11, float 12, valve housing 13, and action arm 14 interactive between said float and valve housing.

Water-collecting tray 11 is comprised of a flat bottom panel 15 and perimeter sidewall 16 bounded by interior and exterior surfaces 17 and 18, respectively. Said tray is preferably of rectangular configuration, having a size adequate to fit beneath a conventional water heater 19. The tray may be fabricated of plastic or sheet metal having corrosion resistant characteristics. Sidewall 16 has a uniform height between about 2 and 4 inches.

Float 12 is fabricated of plastic as a sealed monolithic structure. It is confined within guide means 20, attached to said valve housing, that permits vertical movement while preventing lateral movement. In the illustrated embodiment, said guide means is shown comprised of four upright members 21 extending upwardly at four sides of float 12.

Valve housing 13 is provided with seating bracket 22 attachable to the interior surface 17 of said sidewall by means of threaded bolts 23 adapted to penetrate holes in the sidewall and engage nuts 24 which abut against exterior surface 18 of said sidewall. Said valve housing is comprised of wall structure 25 vertically elongated between upper and lower extremities 26 and 27, respectively. Said wall structure may be fabricated of metal or molded plastic.

A drive rod 28, extending between top and bottom extremities 29 and 30, respectively, is slideably centered within said valve housing by water tight bushing 31. A tapered first valve member 32 is attached to bottom extremity 30 of said drive rod. Stationary, second valve member 33 is incorporated into the interior surface 34 of wall structure 25 as an annular shoulder having a taper adapted to achieve flush-fitting engagement with valve member 32.

Upper and lower portals 36 and 371 respectively, are located respectively above and below said second valve sealing member. Said portals, shown in the form of short tubes attached to or integral with wall structure 25 permit attachment of tubes, hoses, or pipes that convey water into or out of valve housing 13. One of said portals permits entrance of water into the housing, and the other portal permits egress and routing of said water to water heater 19.

A coil spring 39 is interactive between the lower extremity 27 of said valve housing and first valve member 32, and adapted to force said first valve member upwardly. A bearing ring 40 may be disposed below said first valve member to prevent wear or deformation of said valve member as a result of the force applied by the spring. A seating plug 41 downwardly emergent from first valve member 32 and entering the center of said coil spring assuredly positions the coil spring with respect to interaction with said first valve member.

Action arm 14 is comprised of a cam upper portion 42 and an elongated lever portion 43. Said cam upper portion is comprised of oppositely convex bearing surfaces 46 that meet at tip 48. Action arm 14 is joined by pivot pin 45 to said valve housing adjacent the upper extremity thereof in a manner to permit movement of said action arm in a vertical plane. The exact position of such pivoted joinder is such as to permit the tip 48 of said cam portion to exert downward force upon the top extremity 29 of drive rod 28 when lever portion 43 is in a substantially horizontal position.

Float extension means, in the form of frame 50 is shown comprised of a base member 51 adapted to rest upon the top of float 12, and an upwardly directed extension shown as rigid wire 52. The top of wire 52 is configured to engage lever portion 43 of action arm 14. One of the functions of the float extension means is to enable the lifting effect of a very small amount of water in the tray to be transmitted to said lever portion.

Figure 6:
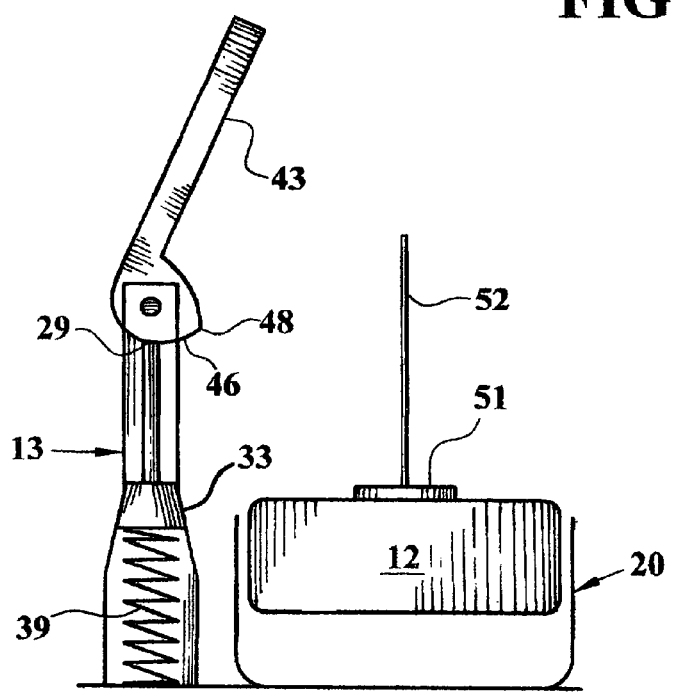
FIG. 6 is a schematic side view showing the position of components during the activated state of the apparatus which prevents water flow therethrough.
Figure 7:
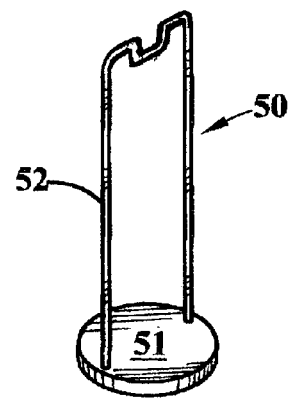
FIG. 7 is a perspective view of a float extension component of the apparatus of this invention.

It is to be noted that only slight movement of action arm 14 is required to cause the tip of cam 42 to disengage from drive rod 28, permitting consequent upward movement of said drive rod. Such construction is in effect a trigger mechanism. It is to be noted that, once the tip of the cam has been dislodged from drive rod 28, said drive rod is forced upwardly by spring 39. Such upward motion, acting upon convex bearing surface 46, rotates arm 14 so that the lever portion becomes located above the cam portion, as shown in FIG. 6.

Restoration of the device to its stand-by state is accomplished by manually depressing lever portion 43, which in turn causes bearing surface 46 of the cam to force the drive rod downwardly to its lowermost position where it is secured by abutment with tip 48 of the cam. In such restoration, wire 52 further serves as stop means which limits the movement of said lever portion, and accurately positions tip 48 atop drive rod 28.

In operation, the apparatus of the present invention, when in a stand-by state wherein there is no water in tray 11, permits water to flow through valve housing 13 en route to water heater 19. If water accumulates in said tray as a result of leakage from the water heater, float 12 rises, causing action arm 14 to release drive rod 28, permitting upward movement thereof drive by spring 39. This causes the first and second valve sealing members to interengage, thereby blocking flow of water between said portals, with attendant shut off of water supply to water heater 19.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Apparatus for automatically shutting off a water supply to a leaking water heater, said apparatus comprising:

a) a water-collecting tray having a perimeter sidewall bounded by interior and exterior surfaces, and configured to be positioned beneath said water heater, b) a float adapted to rest upon water that may accumulate within said tray, c) guide means that permits vertical movement of said float while preventing substantial lateral movement thereof, d) a valve housing attachable to the interior surface of said sidewall and comprised of wall structure vertically elongated between upper and lower extremities and having:
   1) a drive rod slideably centered within said valve housing by way of a water tight seal,
   2) a first valve member attached to the bottom extremity of said drive rod,
   3) a stationary second valve member incorporated into said wall structure,
   4) upper and lower portals located respectively above and below said second valve member, one of said portals permitting entrance of water into said housing, and the other portal permitting egress and routing of said water to said water heater, and
   5) a coil spring interactive between said lower extremity and said first valve member, and serving to force said first valve member upwardly, and
e) an action arm comprised of a cam portion and an elongated lever portion interactive with said float, said action arm being pivotably joined to said housing adjacent said upper extremity in a manner to permit movement of said action arm in a vertical plane while positioning said cam portion to exert downward force upon the top extremity of said drive rod, whereby,
f) when water accumulates within said tray as a result of leakage from said water heater, said float rises, causing said lever portion to rise, thereby causing said cam portion to release downward force from said drive rod, allowing said spring to drive said first valve member into sealing relationship with said second valve member, thereby discontinuing flow of water to the water heater.

2. The apparatus of claim 1 further comprised of float extension means adapted to rest upon said float and extend upwardly to interact with the lever portion of said action arm.

3. The apparatus of claim 1 wherein said sidewall has a uniform height between 2 and 4 inches.

4. The apparatus of claim 1 wherein said float is fabricated of plastic as a sealed monolithic structure.

5. The apparatus of claim 1 wherein said guide means is comprised of upright members extending upwardly at four sides of the float.

6. The apparatus of claim 1 further comprising a bearing ring disposed below said first valve member to prevent deformation of said valve member as a result of the force applied by said spring.

7. The apparatus of claim 1 further comprising a seating plug downly emergent from said first valve member and centered within said coil spring for the purpose of achieving controlled interaction between said spring and valve member.

8. The apparatus of claim 2 wherein said cam portion has a tip adapted to press down atop said drive rod.

9. The apparatus of claim 2 wherein said float extension means is configured so as to accurately seat said manually depressed action arm in a manner establishing a trigger mechanism wherein the tip of said cam portion holds said drive rod in a downwardly forced position.

* * * * *